United States Patent
Kumar et al.

(10) Patent No.: US 12,271,976 B2
(45) Date of Patent: Apr. 8, 2025

(54) SCENE GRAPH STRUCTURE GENERATION AND RENDERING

(71) Applicant: Adobe Inc., San Jose, CA (US)

(72) Inventors: Harish Kumar, Noida (IN); Praveen Kumar Dhanuka, Howrah (IN); Apurva Kumar, Patna (IN)

(73) Assignee: Adobe Inc., San Jose, CA (US)

( * ) Notice: Subject to any disclaimer, the term of this patent is extended or adjusted under 35 U.S.C. 154(b) by 247 days.

(21) Appl. No.: 18/160,483

(22) Filed: Jan. 27, 2023

(65) Prior Publication Data
US 2024/0257408 A1 Aug. 1, 2024

(51) Int. Cl.
*G06T 11/00* (2006.01)
*G06T 1/60* (2006.01)

(52) U.S. Cl.
CPC ........... *G06T 11/00* (2013.01); *G06T 1/60* (2013.01); *G06T 2210/52* (2013.01)

(58) Field of Classification Search
None
See application file for complete search history.

(56) References Cited

U.S. PATENT DOCUMENTS

| | | | |
|---|---|---|---|
| 10,043,233 | B1 | 8/2018 | Beri et al. |
| 2017/0352171 | A1 | 12/2017 | Kumar et al. |
| 2018/0315216 | A1 | 11/2018 | Beri et al. |
| 2019/0019333 | A1 | 1/2019 | Kumar et al. |
| 2020/0020139 | A1 | 1/2020 | Kumar et al. |
| 2020/0219287 | A1 | 7/2020 | Phogat et al. |
| 2020/0242823 | A1 | 7/2020 | Gehlaut et al. |
| 2021/0134037 | A1 | 5/2021 | Beri et al. |
| 2021/0333960 | A1 | 10/2021 | Beri et al. |
| 2024/0070944 | A1 | 2/2024 | Kumar |
| 2024/0212242 | A1 | 6/2024 | Kumar et al. |

OTHER PUBLICATIONS

Johnson et al., "Image Generation from Scene Graphs", IEEE, 2018. (Year: 2018).*
Kumar, Harish, et al., "US Application as Filed", U.S. Appl. No. 17/896,342, filed Aug. 26, 2022, 70 pages.
Kumar, Harish, et al., "US Application as Filed", U.S. Appl. No. 18/145,915, filed Dec. 23, 2022, 50 pages.
Sun, et al., "Image Vectorization using Optimized Gradient Meshes", ACM Transactions on Graphics, vol. 26 No. 3 [retrieved Nov. 14, 2022]. Retrieved from the Internet <https://web.archive.org/web/20140804205101id_/http://research.microsoft.com/pubs/69442/imagevectorization_siggraph07.pdf>., Jul. 2007, 7 pages.
"Non-Final Office Action", U.S. Appl. No. 17/896,342, filed Jan. 3, 2025, 75 pages.

* cited by examiner

*Primary Examiner* — Nicholas R Wilson
(74) *Attorney, Agent, or Firm* — FIG. 1 Patents

(57) ABSTRACT

Digital representation techniques of intertwined vector objects are described. These techniques support a non-destructive representation of intertwined digital objects. Additionally, these techniques support editing of overlaps to change a visual ordering in an intuitive and efficient manner. Optimization operations are also implemented that remove redundancy, combine overlaps into a single representation, address visual artifacts at borders between the intertwined objected, and so forth.

20 Claims, 16 Drawing Sheets

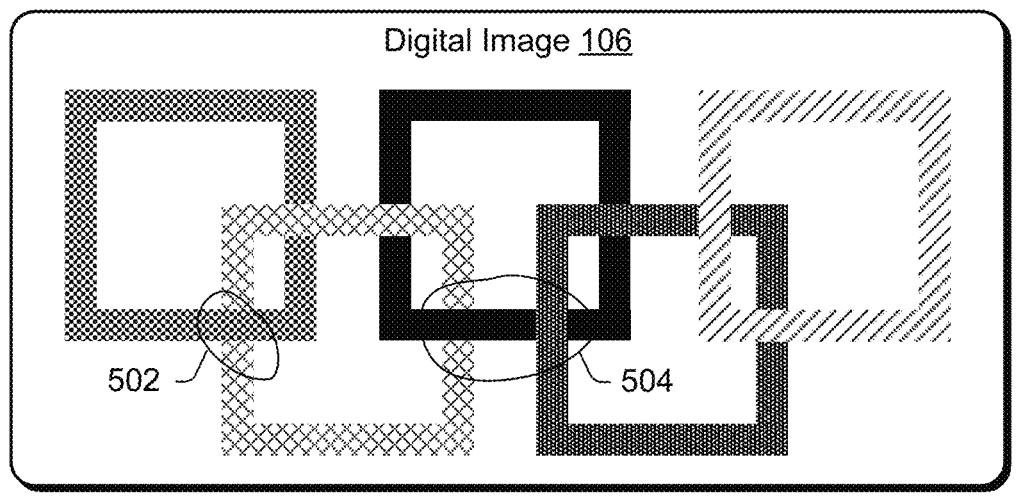
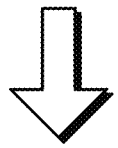
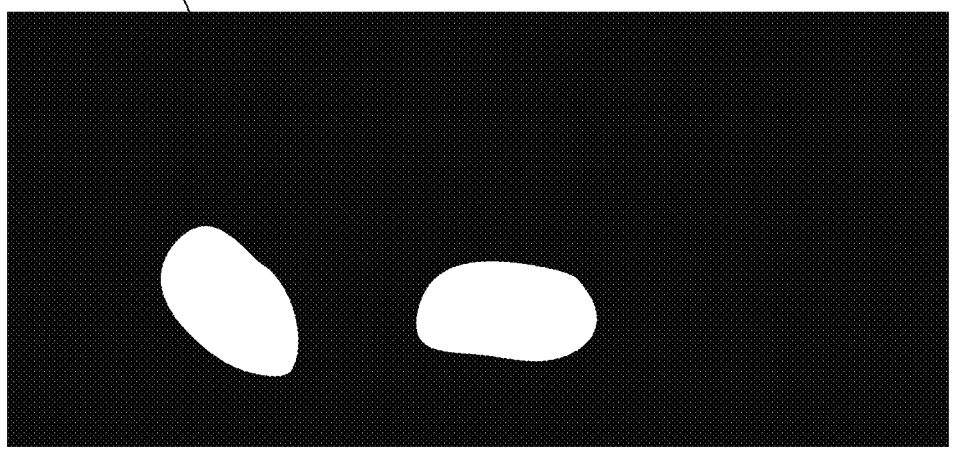
Fig. 7

1200 ⬎

---
Algorithm 1 Algorithm to Render Scene Graph For Intertwined Arts
---
Require: Scene Graph S Consists of Render Tree T, Visual Trees V, Zone Metadata Z, Zone Mask Buffer M
1: procedure RENDERSCENEGRAPH(S, M)
2:  Intertwine bit in Zone mask buffer M ← clear
3:  Fetch Zones from zone metadata Z
4:  Mark Intertwine bit corresponding to Zones in zone mask buffer M
5:  Invert data in zone mask buffer M
6:  Draw render tree T
7:  Intertwine bit in Zone mask buffer M ← clear
8:  for Each Zone zone in Zones do
9:   Mark Intertwine bit corresponding to Zone in zone mask buffer M
10:  Render VisualTree corresponding to this zone
11:  Intertwine bit for zone in Zone mask buffer M ← clear
---

---
Algorithm 2 Algorithm to Render Scene Graph For Clipping paths having Intertwined objects
---
Require: Scene Graph S Consists of Render Tree T, Clipping Path P, Zone Mask Buffer M, Mask Buffer value after Intertwining I
1: procedure RENDERSCENEGRAPH(S, M, I)
2:  Clipping bits in mask buffer M ← clear
3:  Mark Clipping bits (C) corresponding to P in zone mask buffer M
4:  Draw render tree T ← Where mask buffer value = (I AND C)
5:  Clipping bits in Zone mask buffer M ← clear
---

---
Algorithm 3 Algorithm to Render Scene Graph For Intertwined Arts having clipping paths
---
Require: Scene Graph S Consists of Render Tree T, Visual Trees V, Zone Metadata Z, Zone Mask Buffer M, Mask Buffer value after clipping path is installed C
1: procedure RENDERSCENEGRAPH(S, M, C)
2:  Intertwine bit in mask buffer M ← clear
3:  Fetch Zones from zone metadata Z
4:  Mark Intertwine bit (I) corresponding to Zones in zone mask buffer M
5:  Invert Intertwine bit in mask buffer M
6:  Draw render tree T ← Where mask buffer value = (I AND C)
7:  Intertwine bit in Zone mask buffer M ← clear
8:  for Each Zone zone in Zones do
9:   Mark Intertwine bit corresponding to Zone in zone mask buffer M
10:  Render zone's VisualTree ← Where mask buffer value = (I AND C)
11:  Intertwine bit for zone in Zone mask buffer M ← clear
---

1502
Obtain a render tree having a plurality of render nodes that define a visual ordering of a plurality of objects in a digital image

1504
Generate a visual tree for a zone within the digital image, the visual tree including a plurality of visual nodes that define a visual ordering of respective objects within the zone and map to respective render nodes of the render tree corresponding to the respective objects

1506
Form a scene graph structure that includes the render tree and the visual tree that defines rendering of the digital image

1508
Store the scene graph structure as part of the digital image

---
Algorithm 4 Algorithm to Render Scene Graph For Nested Intertwined Arts
---
Require: Scene Graph $S$ Consists of Render Tree $T$, Visual Trees $V$, Zone Metadata $Z$, Zone Mask Buffer $M$
1: procedure DRAWINTERTWINEGROUP(G)
2:     $G$ has Render Tree $TG$, Visual Trees $VG$ and Zone Metadata $ZG$
3:     Intertwine bit in Zone mask buffer $M$ ← clear
4:     DrawRenderTree($TG$)
5:     DrawVisualTrees($VG$)
6: procedure DRAWRENDERTREE($T$)
7:     if $T$ Consists of Intertwine Group $G$ then
8:         DrawIntertwineGroup($G$)
9:         Fetch $ParentID$ from $ZG$
10:        Fetch $V$ from $ParentID$
11:        Install Intertwine bit in Zone mask buffer $M$ using $V$
12:     else
13:        Draw graphics in Z-order
14: procedure DRAWVISUALTREE($V$)
15:     if $T$ consists of Intertwine Group $G$ then
16:        Save $V$
17:        DrawIntertwineGroup($G$)
18:        Install Intertwine bit in Zone mask buffer $M$ using $V$
19:     else
20:        Draw graphics in visual order
21: procedure RENDERSCENEGRAPH($S$, $M$)
22:     Intertwine bit in Zone mask buffer $M$ ← clear
23:     Fetch $Zones$ from zone metadata $Z$
24:     Mark Intertwine bit corresponding to $Zones$ in zone mask buffer $M$
25:     Invert data in zone mask buffer $M$
26:     DrawRenderTree($T$)
27:     Intertwine bit in Zone mask buffer $M$ ← clear
28:     for Each Zone $zone$ in $Zones$ do
29:        Mark Intertwine bit corresponding to $Zone$ in zone mask buffer $M$
30:        DrawVisualTree($VisualTree$)
31:        Intertwine bit for $zone$ in Zone mask buffer $M$ ← clear

Fig. 17

SCENE GRAPH STRUCTURE GENERATION AND RENDERING

BACKGROUND

Digital images are configurable to include a variety of different objects that are renderable for display by a display device, printing by a printer, and so forth. In a first example, objects are configurable as raster objects (e.g., bitmaps) that are defined on a per-pixel basis to represent the object. Raster objects are typically configured for display at a particular resolution (e.g., zoom level) and therefore changing this resolution often introduces errors, visual artifacts, and so forth.

Vector objects have been developed to address these issues as being implemented as a mathematical representation used to define the object which support scaling through a multitude of resolutions without introducing errors. However, in some scenarios conventional techniques used to edit the vector object destroy the underlying representation and therefore this functionality is lost. This makes vector objects that are subject to the edit susceptible to visual artifacts and inaccuracies, and hinder computing device operation that implement these techniques.

SUMMARY

Digital representation techniques of intertwined vector objects are described. These techniques support a non-destructive representation of intertwined digital objects. Additionally, these techniques support editing of overlaps to change a visual ordering in an intuitive and efficient manner. Optimization operations are also implemented that remove redundancy (and thus reduce file size), combine overlaps into a single representation, address visual artifacts at borders between the intertwined objected (e.g., cause by anti-aliasing techniques), and so forth.

Scene graph structure generation and rendering techniques are also described. The scene graph structure supports a compact representation of render trees for intertwined appearances through use of a visual tree having visual nodes that map to the render tree. The scene graph structure supports rendering of intertwined appearances with complex appearance attributes such as clipping groups, transparency groups, blend modes and opacity masks. Further, these techniques support parallel execution in a graphics processing unit and as such improves performance and support real time feedback as part of creating and editing a zone, performing partial rearrange operations, and performing transformations on intertwine groups.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 7 depicts an example implementation of zone marking of zones from a digital image into a zone mask buffer.

FIG. 12 depicts an algorithm to render a scene graph structure to implement the buffer states of FIGS. 9 and 10.

FIG. 13 depicts an example algorithm to render a scene graph structure for clipping groups having intertwined objects.

FIG. 14 depicts an example algorithm to render a scene graph structure for intertwined objects having clipping groups.

FIG. 15 is a flow diagram depicting a procedure in an example implementation of scene graph structure generation.

FIG. 17 depicts an example implementation of an algorithm to render a scene graph structure for nested intertwined hierarchies of objects.

DETAILED DESCRIPTION

Overview

Figure 1:
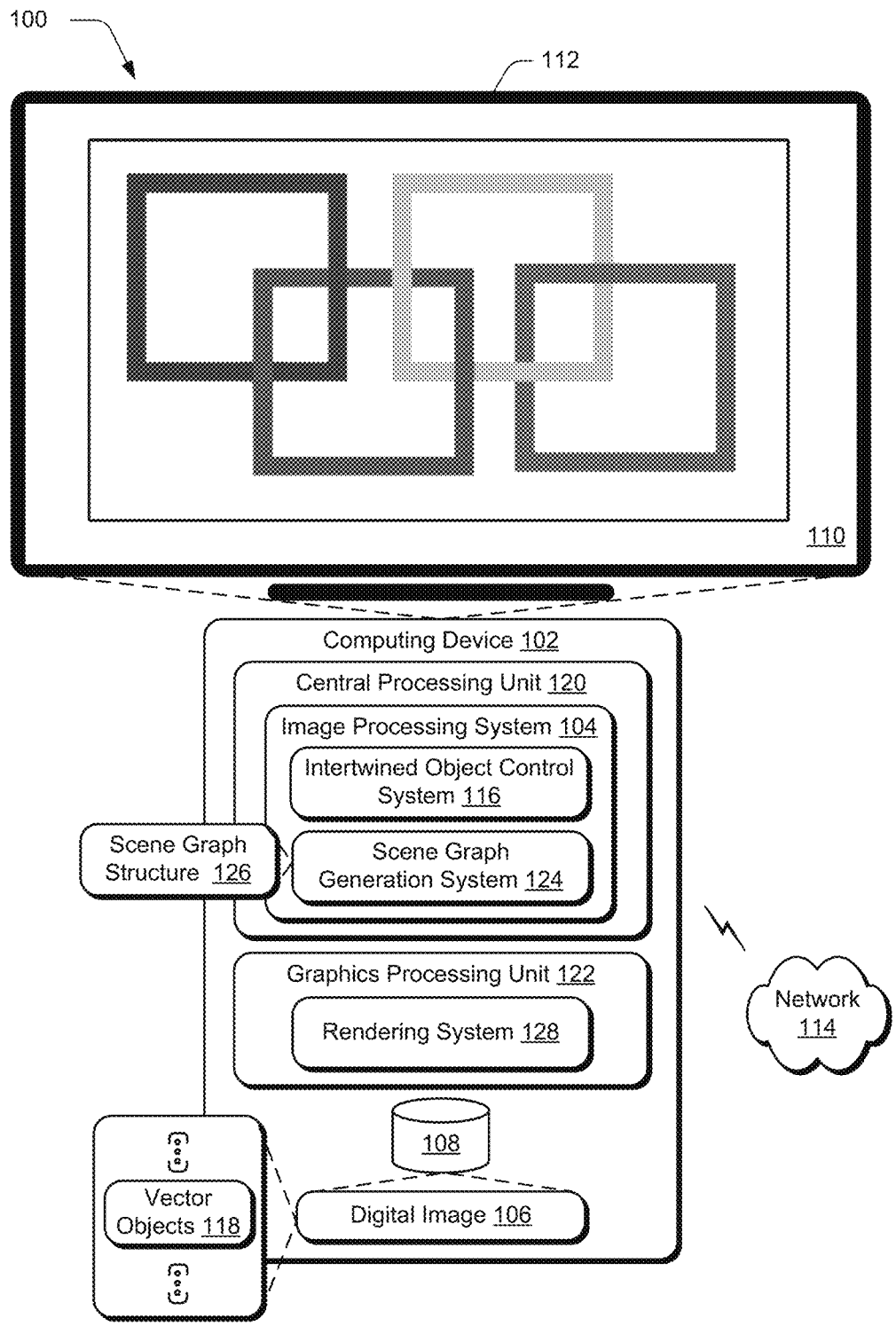
FIG. 1 is an illustration of a digital medium environment in an example implementation that is operable to employ digital representation techniques of intertwined vector objects as described herein.

Vector objects have been developed to expand functionality that is not available via other types of objects, e.g., raster objects. In some scenarios, however, techniques used to edit the vector object "break" an underlying mathematical definition of the vector object, a result of which the object is then susceptible to challenges of these other types of objects, e.g., scaling, aliasing, and so forth.

An example of this involves intertwined objects. Intertwined objects involve a connection between the objects that are twined together such that the objects overlap and/or intersect through each other, often multiple times in a Z-direction. Examples of this include chain links, the Olympic® rings, and so forth. Conventional techniques to support intertwining using vector objects, however, involve destructive representations in which an underlying definition of the vector objects is lost, use of meshes that are challenged when used for complex objects, limit continued editing, and so forth.

Accordingly, digital representation techniques of intertwined vector objects are described. These techniques support a non-destructive representation of intertwined digital objects. Additionally, these techniques support editing of overlaps to change a visual ordering in an intuitive and efficient manner. In an example, a digital image is displayed in a user interface. An input is received that identifies a zone within the digital image. A user input, for instance, is received via a user interface as circling a portion of the digital image. The user input is detected as a path and a boundary of the path is determined, e.g., which mimics the path, as a bounding box, and so forth. This is usable, for instance, in a scenario in which the digital image includes a plurality of vector objects and the user wishes to change an overlap of vector objects within the particular zone.

An intertwined object control system, for instance, detects the zone based on the user input, automatically based on detect vector object overlaps, and so forth. A clipping group is then generated based on the zone. Clipping is a technique used as part of digital image rendering to selectively enable and disable rendering operations with respect to the digital image. This is used in this example to define what is rendered within the zone.

The intertwined object control system generates the clipping group by generating a mask based on the zone, which defines what is to be rendered inside the zone, e.g., where pixels are to be rendered and not rendered with respect to rendering of the digital image. The intertwined object control system also identifies which of the plurality of vector objects are least partially included within the zone. A visual ordering (e.g., Z-ordering) of the identified vector objects within the zone is determined.

The clipping group is then used as a basis to control rendering of which vector objects are included within the zone as well as a visual order of the virtual objects within the zone in a nondestructive manner. In an example, the clipping group is displayed in a user interface. This includes representations of the respective vector objects, e.g., by shape, color, pattern, etc. The representations are further configurable to indicate the visual ordering, e.g., are displayed in an order according to a visual ordering of the vector objects. This display is configurable to include a representation of the zone (e.g., the path) used to define the zone, and so forth.

These representations support user interaction via the user interface to edit the clipping group. This includes changes to the visual ordering and as such supports an ability to define which of the vector objects overlap other vector objects within the zone. This is usable for a plurality of clipping groups within the digital image, each usable to define different visual orderings of the vector objects within respective zones. In this way, the intertwined object control system is usable to control how vector objects are intertwined in a nondestructive manner within the digital image.

The intertwined object control system is also configured to support a variety of optimizations that improve rendering and operation of computing devices that implement these techniques. Intertwine is not a standard construct and as such is not understood by standard rendering engines. Accordingly, rendering techniques are also described that support rendering of intertwined objects directly on a graphics processing unit in parallel to improve machine performance.

To do so, intertwined objects of the clipping group are mapped to constructs that are understandable by conventional rendering engines. Continuing with the previous example, a clipping group is generated for each zone for an intertwined group of vector objects. Each clipping group includes a clipping path that is defined by a geometry of zone, e.g., a boundary of the zone. Each of the vector objects in the intertwine group are added as children of each clipping group. Hence, content complexity linearly increases with the addition of each zone present in the digital image. For even a single zone, for instance, two copies of each of the objects that overlap that zone are maintained, one for rendering a vector object inside a zone and another for rendering a vector object outside the zone. As such, complexity and a number of vector objects included in the zones becomes a major contributor to overall rendering time.

To address these challenges, techniques are also described that improve rendering performance and memory efficiency. In an implementation, this is achieved that is performable directly on a graphics processing unit and promotes memory efficiency to handle nested intertwine appearances.

Intertwining vector objects is a binary operation that is expressible as moving operands (e.g., above or below) in relation to each other in a visual ordering, e.g., a "Z-order." The techniques described herein introduce an advanced representation of a render tree, referred as a "scene graph structure" for representing intertwined appearances of the clipping group in a compact and memory efficient manner. The scene graph structure, for instance, includes a visual tree for each zone in the digital image having an overlap, i.e., for each clipping group generated above. The visual tree includes visual nodes that map to render nodes of a render tree that defines rendering "outside" of the zone in the digital image. The visual tree, for instance, is generated based on the zone to include a mask of a boundary of the zone and mappings to objects in the render tree that are included in the zone. In this way, additional copies of the objects are not generated and stored as part of the digital image, thereby improving memory efficiency.

Additionally, the scene graph structure is amenable to parallel processing on a graphics processing unit. As such, the scene graph structure is configurable to implement techniques to render vector objects on the graphics processing unit (GPU) in a parallel fashion, either by leveraging GPU graphics pipeline or GPGPU methods.

The techniques described in further detail below comply with a variety of rendering techniques for a variety of graphic objects in PDF specification (e.g., direct and indirect objects) including complex appearances such as nested clipping groups, transparency groups and opacity masks, and so on. Further, the techniques are capable of generating intertwined appearances from objects having graphics with complex appearances and are scalable to render nested intertwined appearances without encountering performance and memory limitations. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital representation and rendering techniques of intertwined vector objects as described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 18.

The computing device 102 is illustrated as including an image processing system 104. The image processing system 104 is implemented at least partially in hardware of the computing device 102 to process and transform a digital image 106, which is illustrated as maintained in a storage device 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 is also configurable as whole or part via functionality available via the network 114, such as part of a web service or "in the cloud."

An example of functionality incorporated by the image processing system 104 to process the digital image 106 is illustrated as an intertwined object control system 116. This system is configured to control visual ordering of vector objects 118 within the digital image 106 and rendering of the vector objects 118.

Intertwined vector objects involve a connection between the objects that are twined together such that the objects overlap and/or intersect through each other, often multiple times in a Z-direction. In the illustrated example in the user interface 110, interlocking squares are shown in which each vector object is displayed as overlapping and intersecting another vector object at one location and underlying the same vector object at another location.

Conventional techniques used to support intertwining of vector objects, however, involve destructive representations in which an underlying definition of the vector objects is lost, use of meshes that are challenged when used for complex objects, limit continued editing, and so forth. In a conventional raster example, a vector object is converted into a raster object and then edited. As such, this destroys an underlying mathematical representation and thus is prone to artifacts at different zoom levels and the object is no longer editable using vector object techniques.

In a conventional mesh-based representation technique, the intertwined representation is represented using triangle meshes for an entirety of the intertwined objects, and texture is then mapped onto the triangle meshes. In instances involving different colors or noticeable color differences inside a triangle, the triangle is further subdivided. However, this technique is challenged when confronted with complex objects and other constructs that are not readily supported by meshes, such as gradients, knockout groups, transparency, and so forth. Further, editability remains a challenge and is not consumable as part of a Scalable Vector Graphics (SVG) format.

In the techniques described herein, however, digital representations of intertwined vector objects are supported through use of clipping groups and scene graph structures. The clipping groups and scene graph structures are non-destructive, support continued editing, and avoid visual artifacts of conventional techniques used to configure intertwined digital objects.

Further, the techniques herein also address challenges of rendering the intertwined vector objects. The computing device 102, for instance, includes a central processing unit 120 and a graphics processing unit 122. The central processing unit 120 implements electronic circuitry in hardware (e.g., as an integrated circuit) that executes instructions, typically for general purpose operations for applications, operating systems, and so forth. The graphics processing unit 122, on the other hand, is a specialized electronic circuit that implements parallel processing efficiencies, such as to render the digital image 106 to a color buffer. The graphics processing unit 122 is configurable along with the central processing unit 120 as a single integrated circuit, as dedicated stand-alone integrated circuits that are communicatively coupled vis a bus, and so forth.

The central processing unit 120 is configured to execute the image processing system 104 and the intertwined object control system 116. In order to address challenges of rendering the vector objects 118 as intertwined, a scene graph generation system 124 is executed by the central processing unit 120 to generate a scene graph structure 126 and a rendering system 128 is executed by the graphics processing unit 122 to render the scene graph structure 126.

The scene graph structure 126 is generated by the scene graph generation system 124 as an advanced representation of a render tree for representing intertwined appearances in a compact and memory efficient manner, e.g., based on the clipping group. The scene graph structure 126 supports parallel processing by the graphics processing unit 122 as part of rendering by the rendering system 128. As such, the scene graph structure 126 is configurable to leverage parallel processing techniques to render vector objects as well as other objects (e.g., raster objects) by the graphics processing unit 122. The techniques support rendering of intertwined appearances from objects having graphics with complex appearances and are scalable to render nested intertwined appearances without encountering performance and memory limitations.

In the following discussion, a first section includes an example description of generation of a digital representation of intertwined vector objects. This section is then followed by a section describing object rendering techniques implemented at least in part through generation and rendering using a scene graph structure. In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Intertwined Vector Object Generation Techniques

The following discussion describes clipping group generation and editing techniques that are implementable utilizing the previously described systems and devices. In portions of the following discussion, reference is made to FIGS. 1 and 2 in parallel with first, second, and third stages 302, 304, 306 of an example implementation 300 of FIG. 3.

Figure 2:
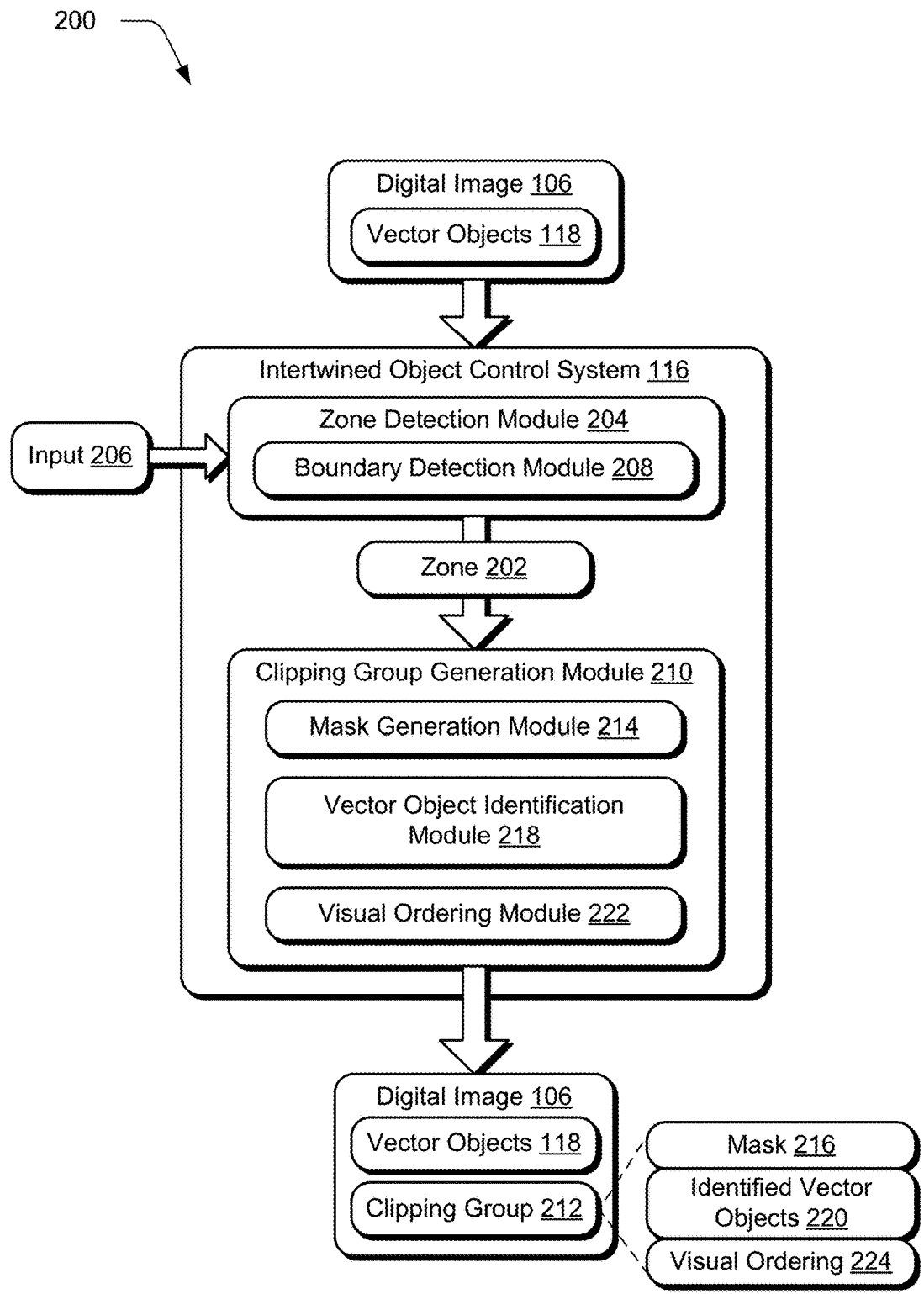
FIG. 2 depicts a system in an example implementation showing operation of an intertwined object control system of FIG. 1 in greater detail.

FIG. 2 depicts a system 200 in an example implementation showing operation of the intertwined object control system 116 of FIG. 1 in greater detail. To begin in this example, an intertwined vector object editing operation is initiated, e.g., via selection in a menu, via receipt of a user input indicating a zone, and so forth. The user interface 110, for instance, receives an input via selection of a representation of the intertwined vector object editing operation from a menu, e.g., "right click" menu, selection from a menu bar, and so forth.

As part of the intertwined vector object editing operation, a zone 202 is detected within a display of a digital image 106 in a user interface 110 by a zone detection module 204. This may be performed automatically and without user intervention by detecting overlaps of the vector objects 118 within the digital image 106. In another example as illustrated at a first stage 302 of FIG. 3, an input 206 is received via the user interface 110 as a freeform line defining a path (e.g., via a cursor control device, gesture, and so forth) within a display of the digital image 106. A boundary detection module 208 then detects a boundary based on the input, e.g., as a path (e.g., using one or more Bezier curves), a bounding box defined based on extremes in the input 206 in X and Y coordinates, and so forth.

A clipping group generation module 210 is then employed to generate a clipping group 212 based on the zone 202. To do so, a mask generation module 214 is utilized to generate a mask 216 based on the zone. As previously described, a mask 216 defines what is to be rendered with respect to the zone 202, e.g., where pixels are to be rendered and not rendered with respect to rendering of the digital image 106. In this example of the first stage 302 of FIG. 3, the mask 216 defines a portion to be rendered within an interior of the path defined by the input 206 and that portions not within that interior are not to be rendered. This is usable to specify multiple locations that are continuous, not continuous (e.g., drawn as brush strokes), and so forth.

A vector object identification module 218 is also employed by the clipping group generation module 210 to identify vector objects within the digital image 106 as included at least partially within the zone 202. The vector object identification module 218, for instance, detects which vector objects 118 intersect the zone 202. Once identified, references to the identified vector objects 220 are included as part of the clipping group 212 by the vector object identification module 218. The clipping group 212 is then usable as a basis to form a scene graph structure 126 as further described below.

A visual ordering module 222 is also leveraged to determine a visual ordering 224 of the identified vector objects 220 within the zone 202. The visual ordering, for instance, defines a Z-ordering and thus overlaps of the identified vector objects 220 within the zone 202. In this way, the clipping group generation module 210 generates the clipping group 212 to include the mask 216, reference the identified vector objects 220, and the visual ordering 224.

The clipping group 212 is renderable for display within the zone 202 in the user interface 110 along with the digital image 106. Accordingly, the clipping group 212 is used to define what is displayed within the zone 202 as part of the digital image 106. Therefore, changes may be made within the zone without affecting other parts of the digital image 106 "outside" of the zone 202.

Figure 3:
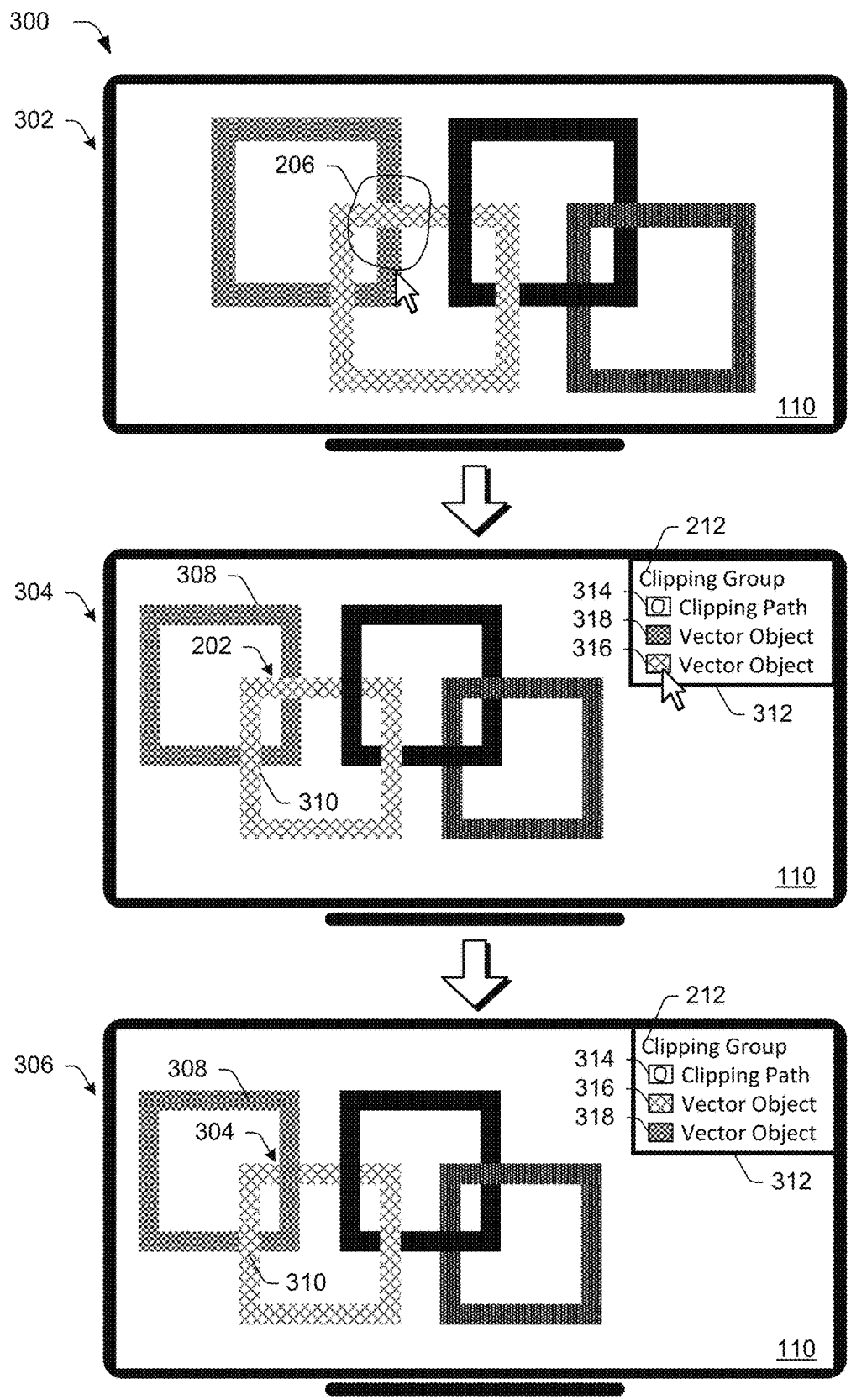
FIG. 3 depicts an example implementation of editing a visual order of vector objects within a clipping group.

As shown at a second stage 304 of FIG. 3, the user interface 110 includes a first vector object 308 and a second vector object 310 that intersect a zone 202. The intertwined object control system 116, in response to receipt of the input 206 at the first stage 302, generates the clipping group 212 using a clipping group generation module 210. The clipping group 212 is displayed in a user interface 110 as part of a menu 312.

The menu 312 in the illustrated example is used to display representations of the vector objects as included as part of the clipping group and indicate the visual ordering in the user interface. The menu 312, for instance, includes a representation 314 of a shape of a path (i.e., the input 206) that defines the zone 202, i.e., the boundary of the zone. The clipping group 212 also includes a first representation 316 of the first vector object 308 and a second representation 318 of the second vector object 310. In this example, the menu 312 indicates a top/down visual ordering 224 of the vector objects, in which the second representation 318 is displayed before and above the first representation 316. A variety of other examples are also contemplated, including nesting of the representations, a tree-structure, overlaps, and so forth.

The visual ordering is then edited through interaction with the representations via the user interface 110. An input, for instance, is received that specifies a position of the first representation 316 of the first vector object 308 in order before the second representation 318 of the second vector object 310. This edit causes the first vector object 308 to be displayed above the second vector object 310 in the user interface 110 as shown at the third stage 306. This is in contrast to the visual ordering of the first and second vector objects 308, 310 as shown at the second stage 304. The digital image 106 including the edited clipping group is then storable as part of the digital image 106, such that reference to the identified vector objects 220 are used to control what is displayed within the confines of the mask 216 and the other (original) vector objects 118 are used for rendering outside the confines of the mask 216. In the following section, a scene graph structure 126 is utilized to improve storage and rendering efficiency of the clipping group as part of the digital image 106.

Scene Graph Structure Generation and Rendering Techniques

Figure 16:
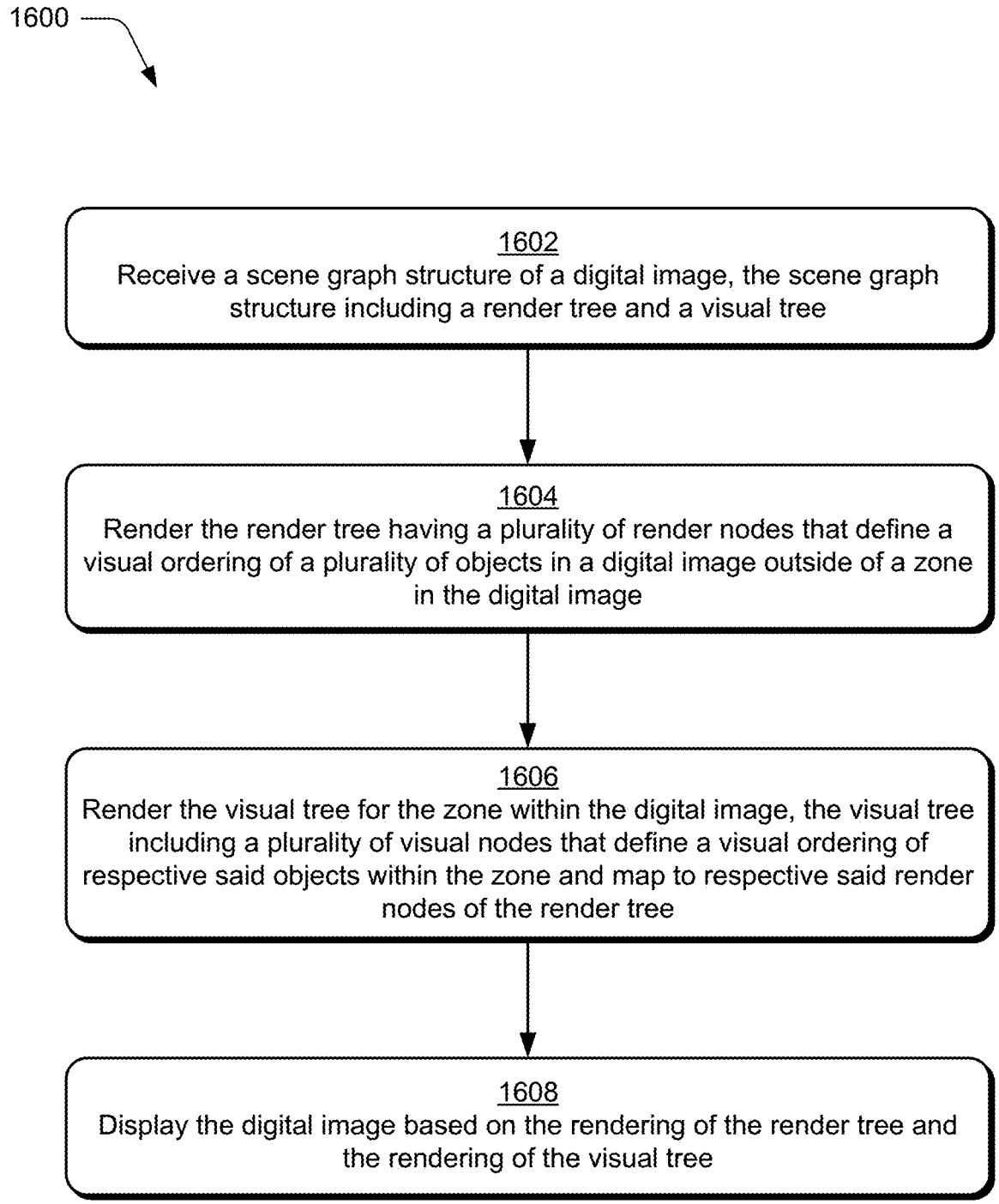
FIG. 16 is a flow diagram depicting a procedure in an example implementation of rendering a scene graph structure.

The following discussion describes scene graph structure generation and rendering techniques that are implementable utilizing the previously described systems and devices. Aspects of the procedures are implemented in hardware, firmware, software, or a combination thereof. The procedures are shown as a set of blocks that specify operations performed by one or more devices and are not necessarily limited to the orders shown for performing the operations by the respective blocks. The following discussion describes operation of systems in parallel with example procedures 1500, 1600 of FIGS. 15 and 16.

Figure 4:
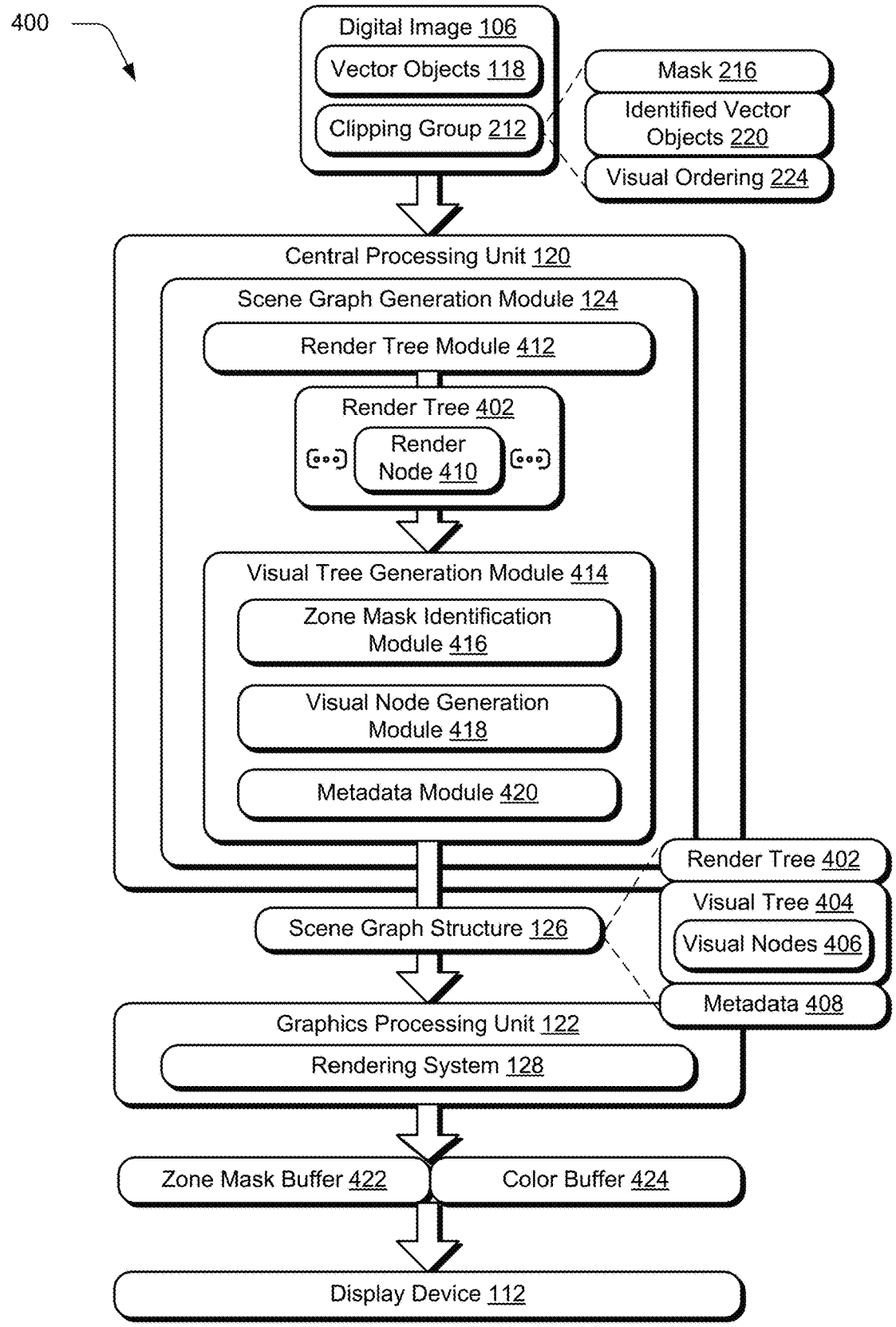
FIG. 4 depicts a system in an example implementation of scene graph structure generation and rendering.

FIG. 4 depicts a system 400 in an example implementation of scene graph structure generation and rendering. As described above, intertwined vector objects define different zones in the digital image 106, with each zone specifying vector objects to be rendered in a different visual ordering, e.g., "Z-order." When defined using a standard render tree, a copy of each of the intertwined objects is included in the render tree for each zone. Accordingly, subsequent rendering by a rendering engine involves traversal over this significantly amplified render tree to independently render each object. As such, this introduces storage and rendering inefficiencies.

To address these challenges, a scene graph structure 126 provides a mechanism to represent a render tree that includes intertwined objects (e.g., of the clipping group 212) in a compact and efficient manner. The scene graph structure 126 includes, in an example, a single render node for each intertwined object in the digital image 106 and defines visual trees for each zone of the image. Render nodes defining intertwined objects and visual trees are bidirectionally linked for efficient access during rendering.

In the illustrated example, a scene graph generation system 124 is executed by a central processing unit 120 to generate a scene graph structure 126. The scene graph structure 126 includes a render tree 402, a visual tree 404 having one or more visual nodes 406, and metadata 408. The render tree 402 includes vector objects 118 from the digital image 106 without an intertwined appearance. Thus, the render tree 402 defines how the digital image 106 is rendered "outside" of the zone defined by the clipping group 212.

The visual tree 404 defines a boundary of each zone for a respective clipping group 212 (e.g., using a mask) and a list of visual nodes 406 that reference a respective render node 410 of the render tree 402. In an implementation, the visual nodes 406 do not define geometry and appearance attributes as described by a render node 410, but rather provide a mapping to the render node 410. A visual tree 404 is generated in this example for each zone having intertwined vector objects 118 in the digital image 106, i.e., for each clipping group 212. The metadata 408 is used to define a list of each of the visual trees 404 in the digital image 106.

The render tree 402 includes a plurality of render nodes 410 for each object (e.g., vector objects 118) in the digital image 106. The render nodes 410 are configurable to support different appearance attributes for a corresponding vector object to achieve a desired appearance and as such is usable to generate multiple implicit render nodes in render tree. For example, consider a digital image having a single object and corresponding fill and stroke attributes. Although the fill and stroke are implemented as properties of a same object, the render tree 402 maps this object into a graphic group having two child nodes. One node specifies the fill attribute and another node specifies the stroke attribute for the object. In a scenario involving advanced attributes such as graphic styles and effects applied to the object, the render tree includes several implicit nodes for a single object in the digital image.

In the illustrated example, a render tree module 412 obtains the render tree 402 having the plurality of render nodes 410. The render nodes 410 include objects (e.g., vector objects, raster objects, and so on) included in the digital image and specify a visual ordering of the objects (block 1502) "outside" of zones in the digital image 106 having an overlap in this example.

The render tree 402 is then passed as an input to a visual tree generation module 414 generate a visual tree 404 for a zone within the digital image 106. The visual tree 404 includes a plurality of visual nodes 406 that define a visual ordering of respective objects within the zone and map to respective render nodes of the render tree corresponding to the respective objects (block 1504). To generate the visual tree 404, the visual tree generation module 414 employs a zone mask identification module 416 to identify a boundary of the zone as a "zone mask," e.g., based on the mask 216 from the clipping group 212. A visual node generation module 418 then generates visual nodes 406 based on identifying a subset of the plurality of objects that intersect the zone. A metadata module 420 is employed to generate metadata 408 that contains a list of each visual tree 404 included in the digital image 106. An output of the scene graph generation system 124 is formed that includes a scene graph structure 126 having the render tree 402, the visual tree 404 formed using visual nodes 406, and the metadata (block 1506) which is storable as part of the digital image 106 (block 1508).

Figure 5:
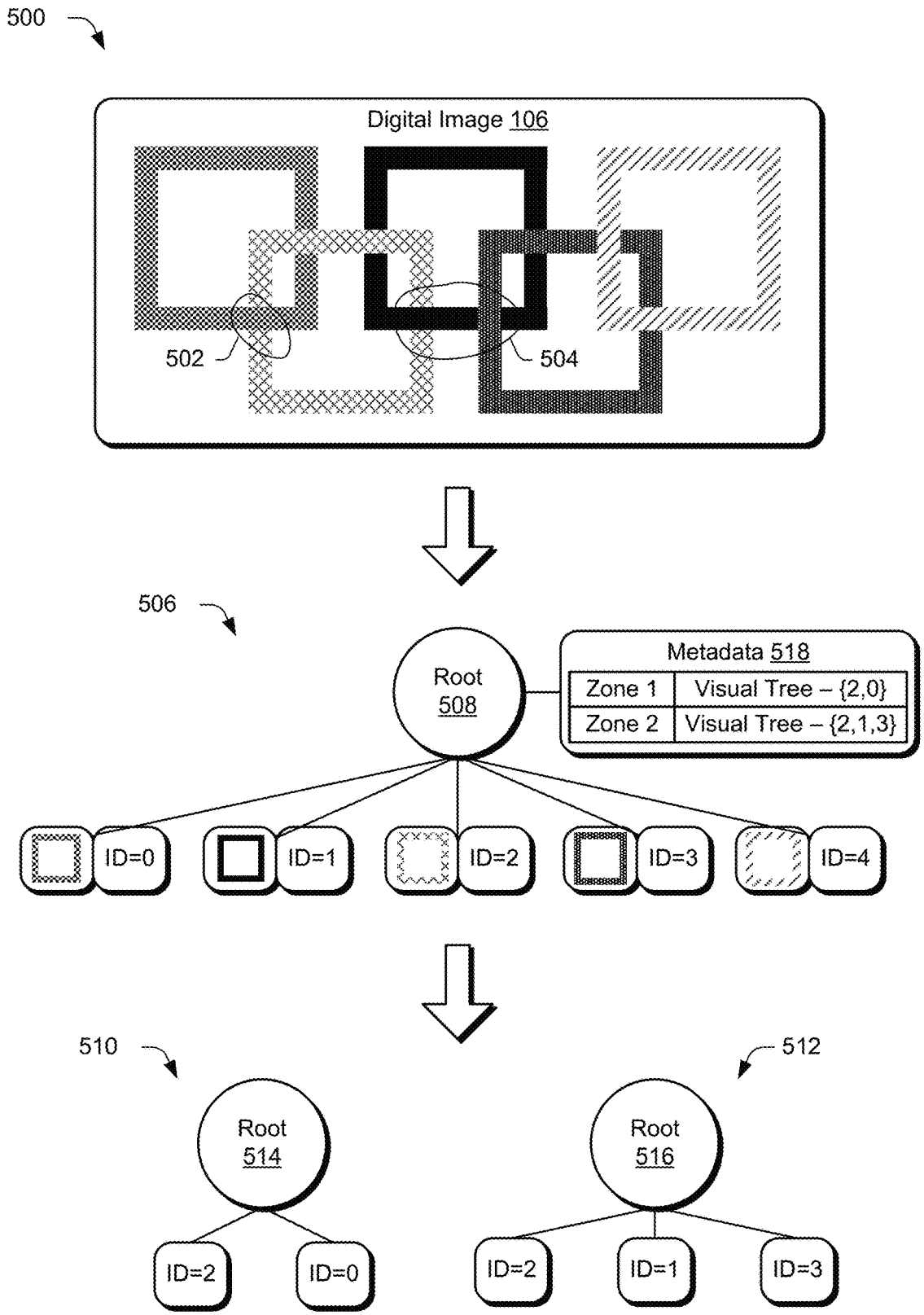
FIG. 5 depicts an example implementation of a scene graph structure generated based on a digital image.

FIG. 5 depicts an example implementation 500 of a scene graph structure 126 generated based on a digital image 106. The digital image 106 includes a first zone 502 and a second zone 504 having a visual ordering (e.g., overlaps) of objects that differs from a visual ordering of the objects defined for the digital image 106 as a whole.

A render tree 506 has a root node 508 and a plurality of render nodes arranged as children from the root node 508. The plurality of render nodes includes the objects from the digital image 106 and further defines a visual ordering of the objects for the digital image 106 as a whole. In other words, the render tree 506 defines a visual ordering of objects "outside" of the first and second zones 502, 504.

The visual tree generation module 414 then generates a first visual tree 510 and a second visual tree 512 based on the first and second zones 502, 504 in order to define a visual ordering within the zones. The visual ordering within the zones differs from the visual ordering of objects specified by the render tree 506. The first visual tree 510, for instance, has a root 514 node and includes visual nodes specifying a visual ordering in which object "ID=2" is disposed beneath object "ID=0," which differs from the visual ordering specified by the render tree 506. Likewise, the second render tree 512 has a root 516 node and includes visual nodes specifying a visual ordering of objects "ID=2," "ID=1," and "ID=3." The visual trees are storable as part of metadata 518 of the scene graph structure 126 that includes a listing of each visual tree included as part of the digital image 106.

Figure 6:
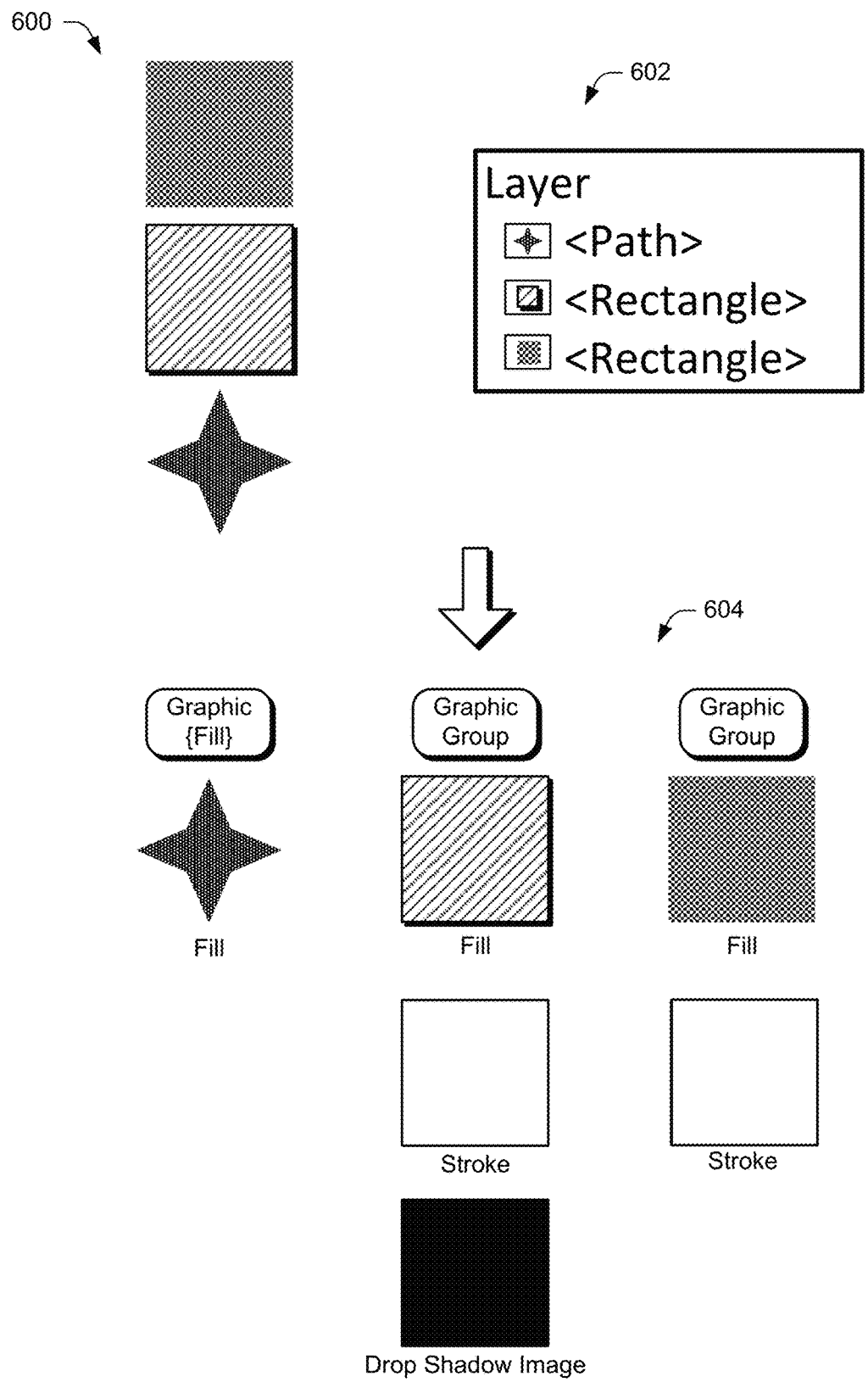
FIG. 6 depicts an example implementation of a render tree.

FIG. 6 depicts an example implementation 600 of a render tree. In order to generate the visual trees, the visual tree generation module 414 receives, as an input, indices of the objects in the render tree 402. In the illustrated example, objects as stacked in a layer panel 602 are illustrated, which include multiple implicit objects in a render tree 604 (e.g., fill, strokes, drop shadow image objects) as a graphics group.

Returning again to FIG. 4, the scene graph structure 126 of the digital image is received by the rendering system 128, which is implemented by a graphics processing unit 122 in this example. The render tree 402 is rendered as having a plurality of render nodes 410 that define a visual ordering of a plurality of objects in a digital image 106 outside of a zone in the digital image 106 (block 1604).

The visual tree 404 is also rendered by the rendering system 128 for the zone within the digital image 106. The visual tree 404 includes a plurality of visual nodes 406 that define a visual ordering of respective objects within the zone and map to respective render nodes 410 of the render tree 402 (block 1606). The digital image 106 is then displayed (e.g., by a display device 112) based on the rendering of the render tree and the rendering of the visual tree (block 1608).

In the illustrated example, the rendering system 128 employs a zone mask buffer 422 and a color buffer 424 to render the scene graph structure 126 for display by the display device 112. The zone mask buffer 422 is used to transiently control rendering of objects while drawing render tree and visual trees for an intertwine group.

The zone mask buffer 422 is configured to mark zones of the visual tree in a render pass. Marked pixels in the zone mask buffer 422 represent each of the pixels which lie inside a zone boundary, e.g., as a "1-bit" per pixel buffer. The zone mask buffer 422 is configurable as a dedicated single bit buffer per zone, may be interleaved with existing buffers in use for rendering other constructs in the digital image 106, and so on. During any stage in render pass for the digital image 106, this buffer may have bits set for individual pixels in each of the zones, an individual zone, or none of the zones in the digital image 106. Since zones are not part of the render tree and not an object that contributes to appearance, writes to the color buffer 424 are disabled in an implementation during marking of bits in the zone mask buffer 422.

Given a zone mask buffer 422 and a triangulated geometry of objects in the mask 216, the first step to render the scene graph structure 126 in this example is to first mark zone boundaries on the zone mask buffer 422. In the following discussion, a specific bit in zone mask buffer 422 used to represent pixels inside a zone is referred as an "intertwine bit." The intertwine bit is configurable as a single bit in the zone mask buffer 422 or a specially designated bit in a scenario in which the zone mask buffer 422 is shared with other buffers.

FIG. 7 depicts an example implementation 700 of zone marking of zones from a digital image into a zone mask buffer 422. For the zone mask buffer 422, pixels included within the first and second zones 502, 504 are indicated in white and pixels not included within the zones are indicated in gray.

The rendering system 128 utilizes the intertwine bit in the zone mask buffer 422 to determine whether pixels are inside the zone boundary. The intertwine bit, for instance, is marked for the pixels inside of the zone and the zone is then drawn. Because the zone is not to be rendered on the color buffer 424, color blending for drawing the zone is disabled. Pixels inside the zone are marked as an intertwine bit. This operation is performed for each of the zones present in the digital image 106.

Figure 8:
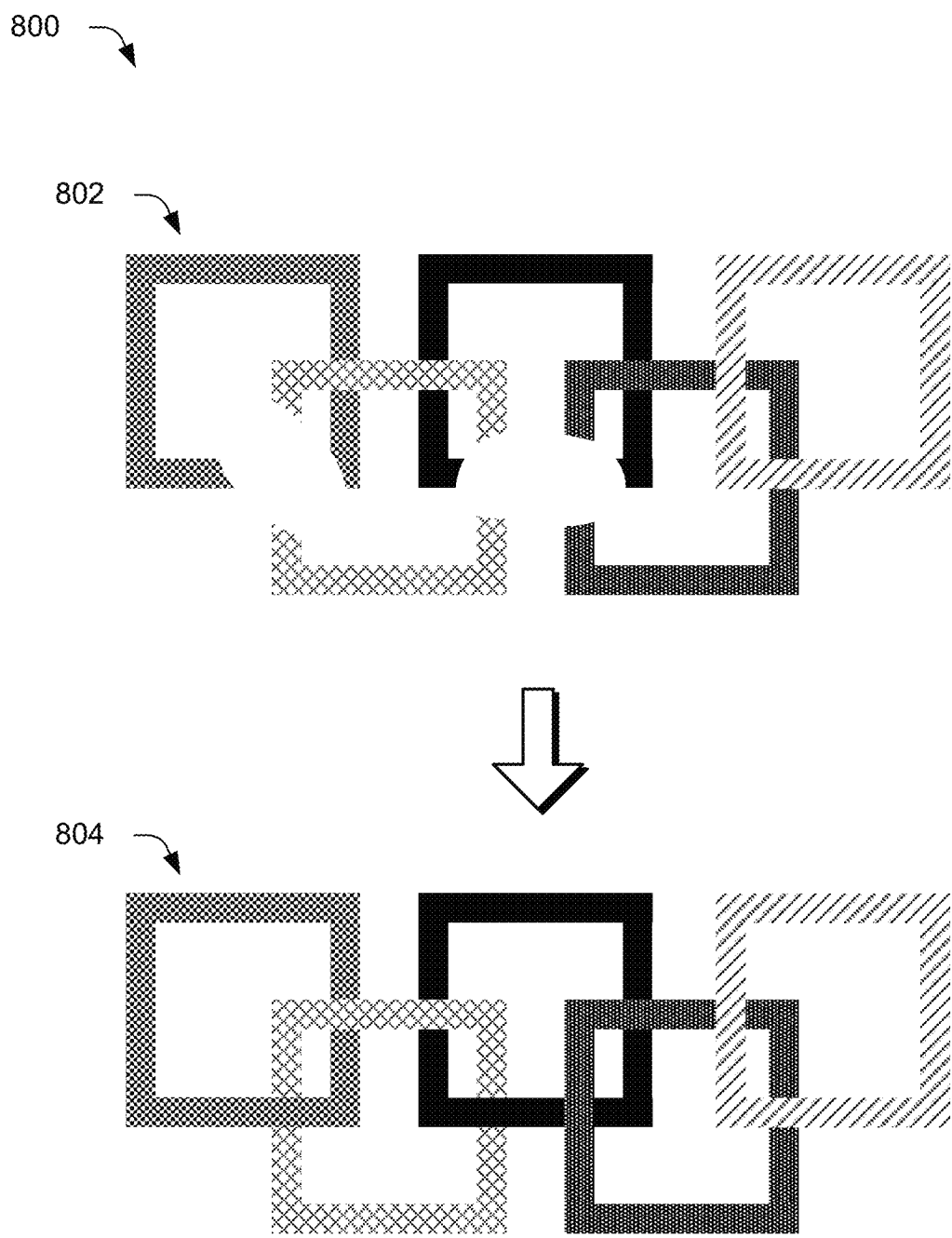
FIG. 8 depicts an example implementation of a first set of operations to render the render tree followed by a second set of operations to render the visual tree of the scene graph structure.

FIG. 8 depicts an example implementation 800 of a first set of operations 802 to render the render tree followed by a second set of operations 804 to render the visual tree of the scene graph structure 126. In order to render the render tree by the rendering system 128 of the graphics processing unit 122, the render nodes 410 of the render tree 402 are rendered in the visual ordering, e.g., using porter/duff compositing. This rendering is performed to mark pixels in the color buffer 424 that do not lie inside boundary of any zone. To achieve this, following steps are performed.

First, a "quad" is rendered equal to a bounding box of the digital image 106 as part of mask inversion. The state is configured such that within the bounds, after drawing the quad, each of the bits of the mask defining the zone are inverted. As a result of this operation, the zone mask buffer 422 has a "1" for each of the pixels which lie outside a boundary of the zone. Each of the pixels lying inside zone boundary are marked with a "0."

The objects are then rendered in a visual ordering defined by the render tree 402. Each of the objects are drawn and composited based on corresponding appearance attributes. The render tree 402 is configurable to support different possible combinations of transparency groups, clip groups, opacity masks, and so on. For draw and composition operations performed for rendering the render tree 402, the output fragments pass through an additional condition to check for an "intertwine bit" in the zone mask buffer 422 and contributes to the color buffer 424 when "intertwine bit" is set. These additional checks can be simulated using a shader or can be achieved in graphics pipeline using a set of stencil and depth tests.

Once rendering of the render tree 402 is completed, values of the zone mask buffer 422 are cleared to "0." A draw call is issued to render a quad equal to bounding box of the digital image 106 and each of the "intertwine bits" are cleared to "0" irrespective of a current state of an intertwine bit.

In order to render the visual trees, the rendering system 128 processes metadata 408 to access each of the visual trees 404. For each visual tree, the following operations are performed. For zone masking, a zone boundary is triangulated using a tessellation algorithm and rendered to the zone mask buffer 422. Writes are not performed to the color buffer 424 while drawing the zone boundary. As a result of this operation, the zone mask buffer 422 has a value of "1" for each of the pixels which lies inside a boundary of the zone. Each of the pixels lying outside zone boundary are marked with "0" in this example.

The objects are rendered (e.g., drawn) according to a visual ordering defined by the visual tree 404. Visual nodes 406 in the visual tree 404, as previously described, are mappings to respective render nodes 410. The visual nodes 406 are processed in order specified by the visual tree 404 and for each visual node 406, a render call is issued for the corresponding render node 410. The corresponding render node 410 is configurable as a sub-tree and is also configurable to support portable document format constructs.

For draw and composition operations performed for the render node 410, the output fragment again passes through an additional condition to check whether an "intertwine bit" is set in the zone mask buffer 422. If set, the output fragment contributes to the color buffer 424. Since the intertwine bit is set for pixels within the zone, the draw calls function to mark pixels inside zones. Other values are discarded and do not contribute to color in pixels outside the zone in the color buffer 424. Once the visual tree 404 is rendered, the zone mask buffer 422 is cleared to "0." For example, the tessellated geometry generated for the zones above is usable to issue a draw call to clear "intertwine bit" values in the zone mask buffer 422.

Figure 9:
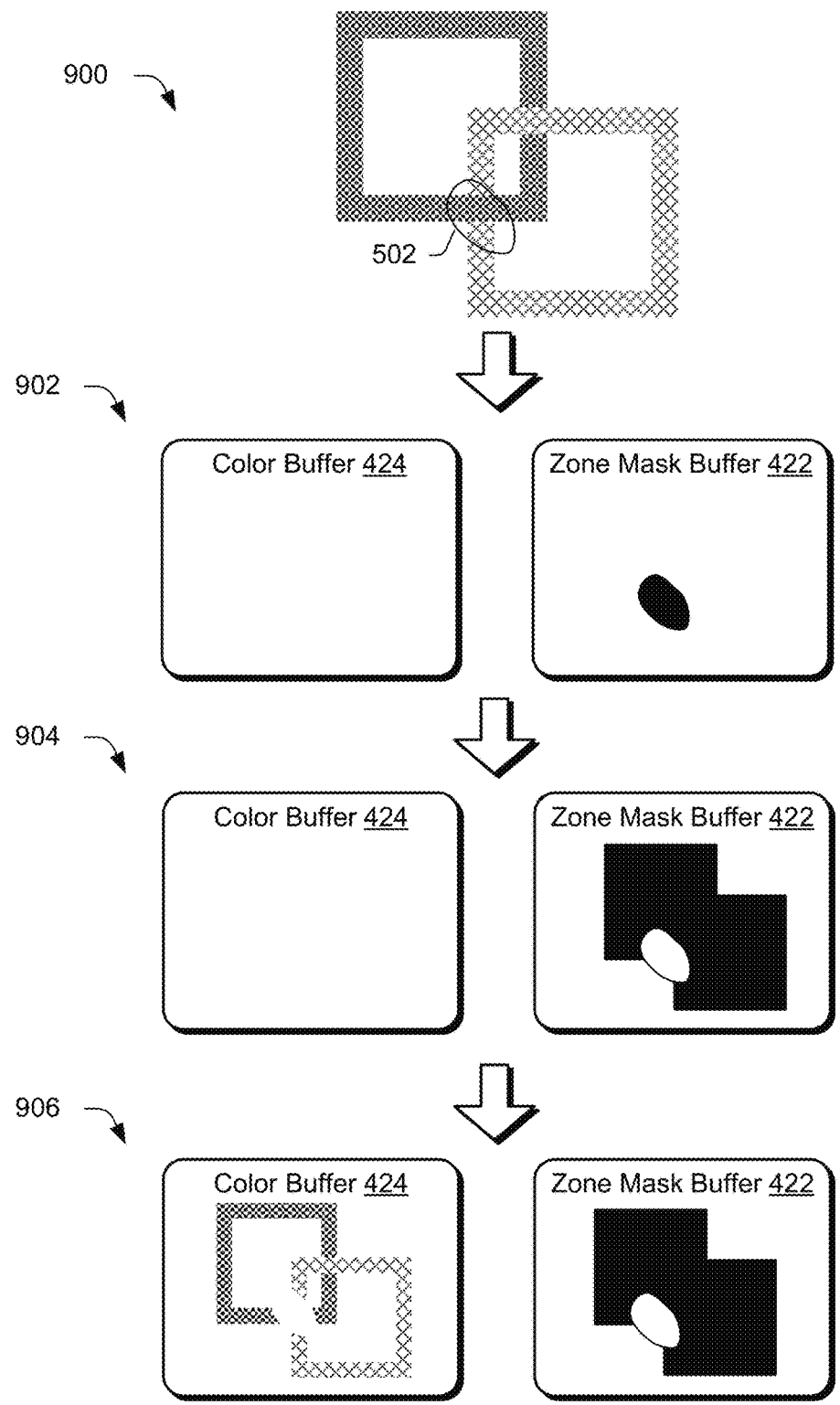
FIGS. 9 and 10 depict a plurality of buffer states of the zone mask buffer and the color buffer in rendering a render tree followed by a visual tree.
Figure 10:
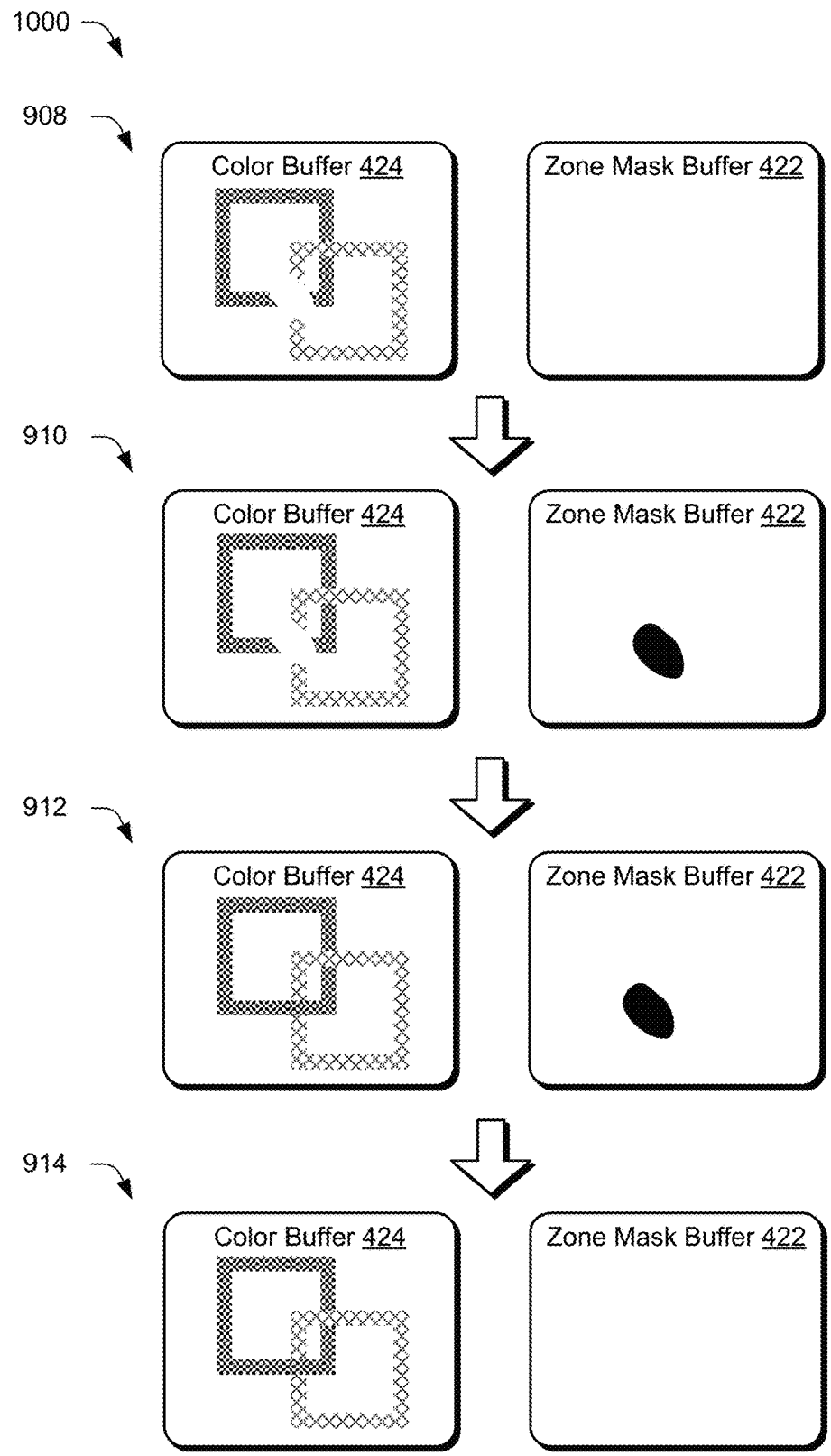

FIGS. 9 and 10 depict example implementations 900, 1000 of a plurality of buffer states of the zone mask buffer and the color buffer in rendering a render tree followed by a visual tree of a scene graph structure. FIG. 12 depicts an algorithm 1200 to render a scene graph structure to implement the buffer states of FIGS. 9 and 10. At a first state 902, pixels contributed to the first zone 502 are marked in the zone mask buffer 422. At a second state 904, the mask in the zone mask buffer 422 is inverted. At a third state 906, objects are rendered (e.g., drawn) in the color buffer 424 based on the marking of the pixels in the inverted mask in the zone mask buffer 422.

Continuing with FIG. 10, at a fourth state 908 the zone make buffer 422 is cleared. At a fifth state 910, pixels contributing to the first zone 502 are marked in the zone mask buffer 422. At a sixth state 912, the objects inside the marked zone are rendered (e.g., drawn) to the color buffer 424 based on a visual ordering specified by the visual tree 404. At the seventh state 914, the zone mask buffer 422 is cleared and the color buffer 424 includes a result of rendering the render tree and the visual tree as supporting interleaving of objects.

Clipping groups and intertwine groups are two different constructs to achieve different types of appearances of objects within a digital image 106. However, both constructs employ a common set of system resources to control how fragments contribute to color of pixels in the color buffer 424. Since the availability of these resources is limited and have a direct effect on performance, acquiring different copies of a same resource for a clipping group and an intertwine group in a digital image 106 has the potential to significantly degrade performance and reduce a benefit of using the graphics processing unit 122.

Accordingly, techniques are described to render both clipping groups and intertwine groups with shared resources that are not changed in a middle of rendering a digital image to maximize performance. To do so, the zone mask buffer 422 is shared by clipping groups and intertwine groups. Per-pixel "N" bits of the vector mask buffer 422 are partitioned into two segments, named as "intertwine bits" and "clipping bits." These N-bits are managed to ensure that clipping group rendering does not interfere with rendering of intertwine groups.

Bit level control is implemented to support bit level operations for the zone mask buffer 422. For example, different "read" and "write" masks are defined, respectively, for clipping groups and intertwine groups. These masks are combined (e.g., using an "AND" operation) with the reference values to be written to or read from the zone mask buffer 422. For a write to the zone mask buffer 422 as part of an intertwining operation, for instance, the reference value to be written is combined with the write mask for a corresponding zone. This operation ensures that bits allocated for one operation are not utilized in another operation.

FIG. 13 depicts an example algorithm 1300 to render a scene graph structure for clipping groups having intertwined objects. If a clipping group and intertwine groups are at the same level of the scene graph structure 126, additional operations are not involved as both operations clear the mask buffer once completed. FIG. 14 depicts an example algorithm 1400 to render a scene graph structure for intertwined objects having clipping groups.

Figure 11:
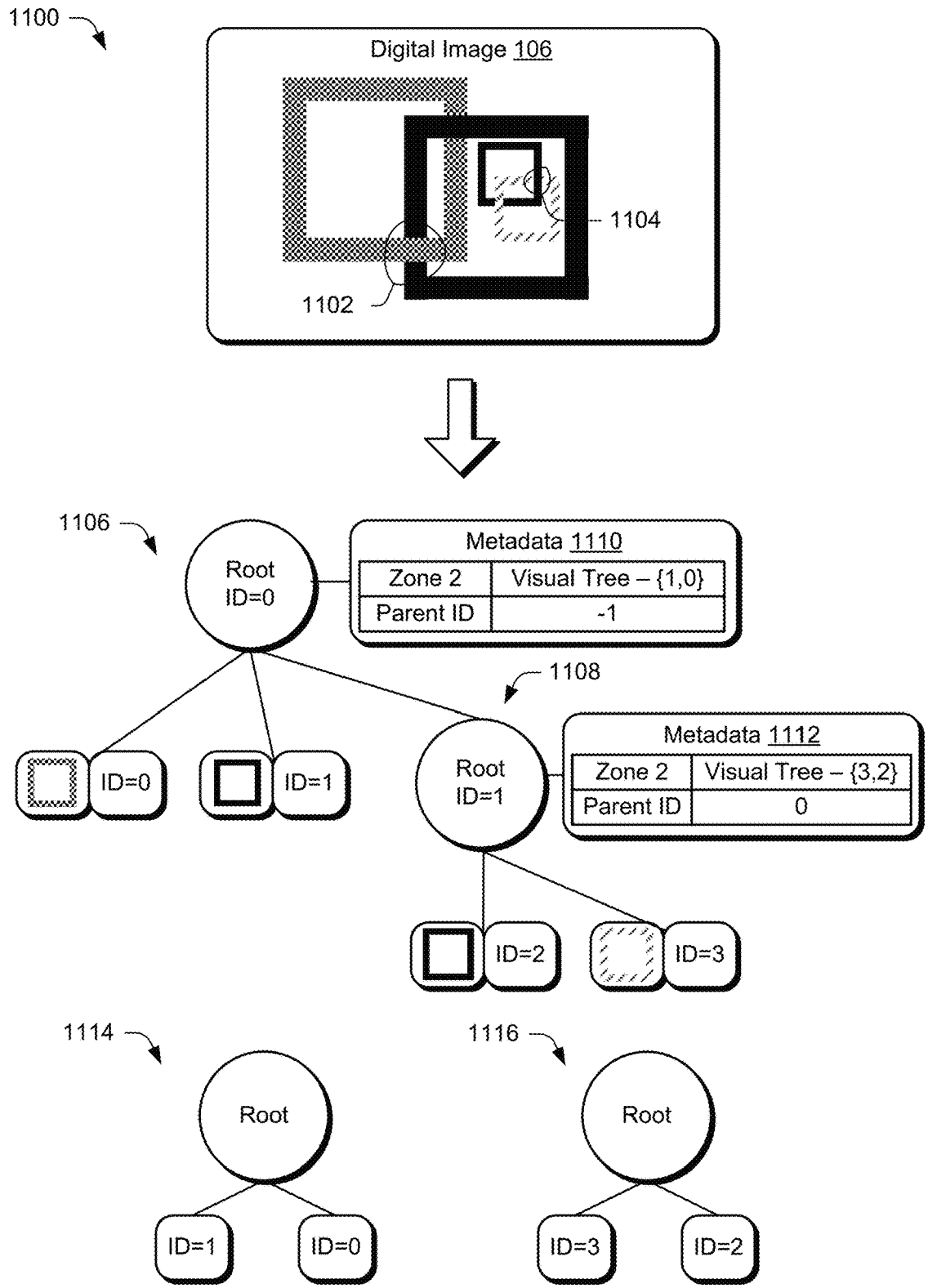
FIG. 11 depicts an example implementation of a scene graph structure generated for a digital image having nested and intertwined objects.

FIG. 11 depicts an example implementation 1100 of a scene graph structure 126 generated for a digital image 106 having nested and intertwined objects. FIG. 17 depicts an example implementation 1700 of an algorithm to render a scene graph structure for nested intertwined hierarchies of objects. Nested intertwine hierarchies refer to an object hierarchy where an intertwined object is in child hierarchy of another intertwine group. An example of this is illustrated for first and second zones 1102, 1104 in the digital image 106. There can be multiple such pairs of parent and child intertwine groups in a hierarchy. One intertwine group, for instance, can be included in a child hierarchy of an intertwine group and can also have another intertwine group in its child hierarchy.

Each such intertwine group for the respective first and second zones 1102, 1104 defines its own scene graph structure, examples of which are illustrated as a first scene graph structure 1106 and a second scene graph structure 1108 having respective first metadata 1110 and second metadata 1112. The first and second metadata 1110, 1112 carry additional data illustrated as "Parent ID" for querying parent intertwine groups during rendering of a corresponding scene graph structure. A parent intertwine group is configurable as any node in its ancestor hierarchy in a render tree 402. Visual trees 1114, 1116 are also included defining visual orderings within the respective first and second zones 1102, 1104.

One technique usable to support nested intertwined appearances utilizes a zone mask buffer 422 for each zone (i.e., intertwine group) in a nested hierarchy. Whenever a new intertwine group is encountered in a render pass, a new zone mask buffer is created. The number of zone mask buffers is equal to a depth of the nested intertwine hierarchy. In order to increase memory efficiency, a same intertwine bit of the same mask buffer is used at each of the levels. Additionally, a property is established such that zones corresponding to an intertwine group at a particular level are limited to impacting a visual ordering of nodes that are direct children of that intertwine group. If a direct child of intertwine group is again an intertwine group (e.g., an intertwine group at level "i+1"), an impact of zones corresponding to this group is limited to its direct children irrespective of the zones of an "$i^{th}$" intertwine group. To address this, these techniques incorporate a "clear or install" policy whenever an intertwine group is encountered for which a parent is also an intertwine group. Such intertwine groups can be encountered while rendering a render tree or a visual tree of a digital image 106.

Accordingly, to render an intertwine group in a render tree 402, the following operations are performed:
1. 'CLEAR' mask buffer;
2. Draw render tree for new intertwine group;
3. Draw visual trees for new intertwine group;
4. Query visual trees of parent intertwine group using metadata of new intertwine group; and
5. 'INSTALL' mask buffer using parent's visual trees.

Likewise, to render an intertwine group in a visual tree, the following operations are performed:
1. Save current drawing of visual tree of parent intertwine group;
2. 'CLEAR' mask buffer;
3. Draw render tree for new intertwine group;
4. Draw visual trees for new intertwine group; and
5. 'INSTALL' mask buffer using parent's visual tree saved at step 1.

A variety of other examples are also contemplated.

Accordingly, the scene graph structure supports a compact representation of render trees for intertwined appearances. Additionally, techniques are described that support rendering of intertwined appearances with complex appearance attributes such as clipping groups, transparency groups, blend modes and opacity masks. Further, techniques are described to render nested intertwined appearances that is independent of levels of nesting of intertwined groups in a render tree. The techniques support parallel execution in a graphics processing unit and as such improve performance. These techniques also support real time feedback as part of creating and editing a zone as described in relation to FIGS. 2 and 3, performing partial rearrange operations, and performing transformations on intertwine groups.

Example System and Device

Figure 18:
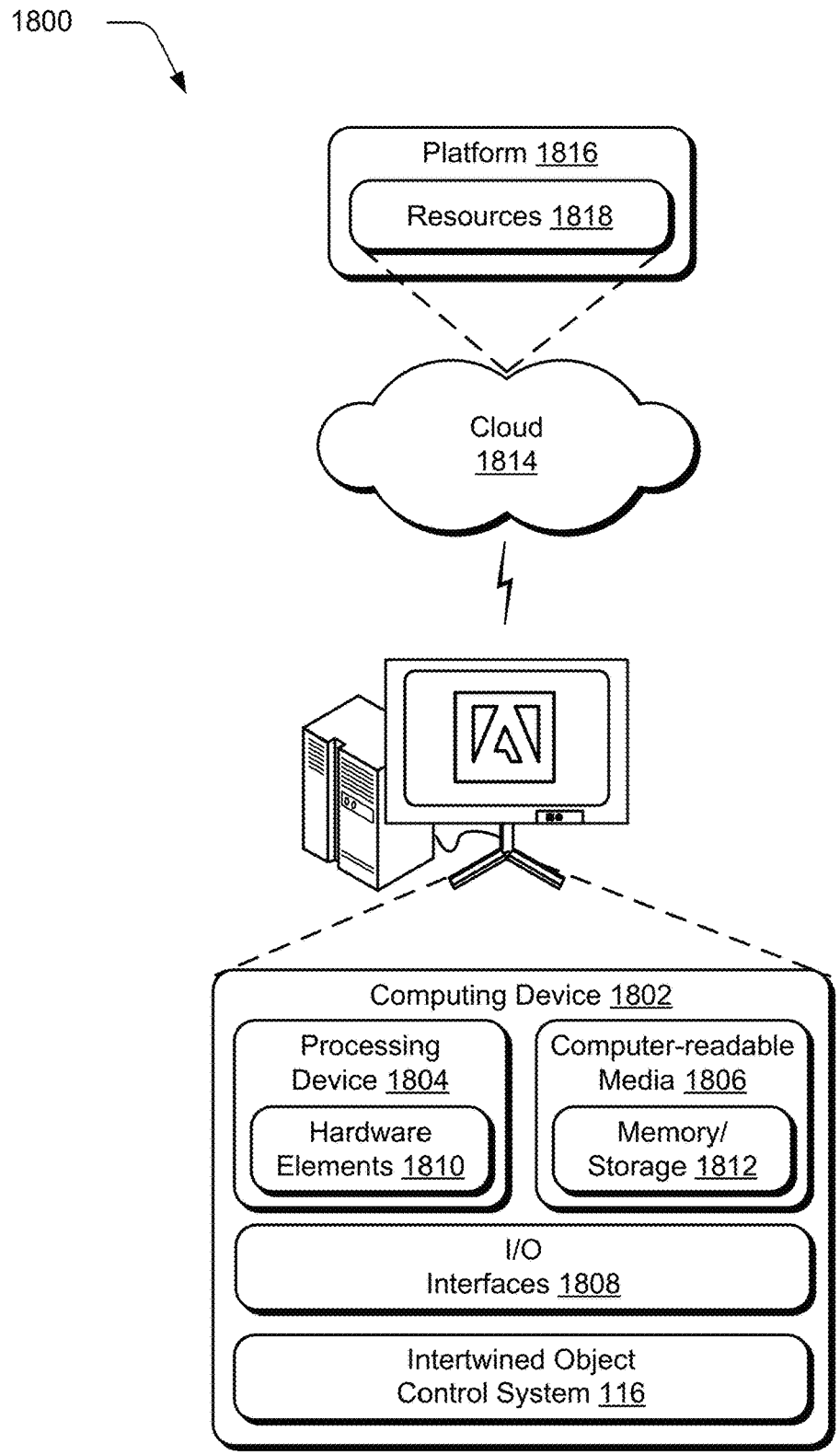
FIG. 18 illustrates an example system including various components of an example device that can be implemented as any type of computing device as described and/or utilize with reference to FIGS. 1-17 to implement embodiments of the techniques described herein.

FIG. 18 illustrates an example system generally at 1800 that includes an example computing device 1802 that is representative of one or more computing systems and/or devices that implement the various techniques described herein. This is illustrated through inclusion of the intertwined object control system 116. The computing device 1802 is configurable, for example, as a server of a service provider, a device associated with a client (e.g., a client device), an on-chip system, and/or any other suitable computing device or computing system.

The example computing device 1802 as illustrated includes a processing device 1804, one or more computer-readable media 1806, and one or more I/O interface 1808 that are communicatively coupled, one to another. Although not shown, the computing device 1802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1804 is representative of functionality to perform one or more operations using hardware. Accordingly, the processing device 1804 is illustrated as including hardware element 1810 that is configurable as processors, functional blocks, and so forth. This includes implementation in hardware as an application specific integrated circuit or other logic device formed using one or more semiconductors. The hardware elements 1810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1806 is illustrated as including memory/storage 1812 that stores instructions that are executable to cause the processing device 1804 to perform operations. The memory/storage 1812 represents memory/storage capacity associated with one or more computer-readable media. The memory/storage 1812 includes volatile media (such as random access memory (RAM)) and/or nonvolatile media (such as read only memory (ROM), Flash memory, optical disks, magnetic disks, and so forth). The memory/storage 1812 includes fixed media (e.g., RAM, ROM, a fixed hard drive, and so on) as well as removable media (e.g., Flash memory, a removable hard drive, an optical disc, and so forth). The computer-readable media 1806 is configurable in a variety of other ways as further described below.

Input/output interface(s) 1808 are representative of functionality to allow a user to enter commands and information to computing device 1802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1802. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1810 and computer-readable media 1806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1810. The computing device 1802 is configured to implement particular instructions and/or functions corresponding to the software and/or hardware modules. Accordingly, implementation of a module that is executable by the computing device 1802 as software is achieved at least partially in hardware, e.g., through use of computer-readable storage media and/or hardware elements 1810 of the processing device 1804. The instructions and/or functions are executable/operable by one or more articles of manufacture (for example, one or more computing devices 1802 and/or processing devices 1804) to implement techniques, modules, and examples described herein.

The techniques described herein are supported by various configurations of the computing device 1802 and are not limited to the specific examples of the techniques described herein. This functionality is also implementable all or in part through use of a distributed system, such as over a "cloud" 1814 via a platform 1816 as described below.

The cloud 1814 includes and/or is representative of a platform 1816 for resources 1818. The platform 1816 abstracts underlying functionality of hardware (e.g., servers) and software resources of the cloud 1814. The resources 1818 include applications and/or data that can be utilized while computer processing is executed on servers that are remote from the computing device 1802. Resources 1818 can also include services provided over the Internet and/or through a subscriber network, such as a cellular or Wi-Fi network.

The platform 1816 abstracts resources and functions to connect the computing device 1802 with other computing devices. The platform 1816 also serves to abstract scaling of resources to provide a corresponding level of scale to encountered demand for the resources 1818 that are implemented via the platform 1816. Accordingly, in an interconnected device embodiment, implementation of functionality described herein is distributable throughout the system 1800. For example, the functionality is implementable in part on the computing device 1802 as well as via the platform 1816 that abstracts the functionality of the cloud 1814.

In implementations, the platform 1816 employs a "machine-learning model" that is configured to implement the techniques described herein. A machine-learning model refers to a computer representation that can be tuned (e.g., trained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a processing device, the method comprising:
    obtaining, by the processing device, a render tree having a plurality of render nodes that define a visual ordering of a plurality of objects in a digital image;
    generating, by the processing device, a visual tree for a zone within the digital image, the visual tree including a plurality of visual nodes that define a visual ordering of respective said objects within the zone and map to respective said render nodes of the render tree corresponding to the respective said objects;
    forming, by the processing device, a scene graph structure that includes the render tree and the visual tree that defines rendering of the digital image; and
    storing, by the processing device, the scene graph structure as part of the digital image.

2. The method as described in claim 1, wherein the generating the visual tree includes identifying an object of the plurality of objects that at least partially overlaps the zone and generating a respective said visual node that maps, respectively, to a respective said render node corresponding to the identified object.

3. The method as described in claim 1, wherein the generating the visual tree is based on a boundary of the zone defined within the digital image using a mask.

4. The method as described in claim 1, wherein the visual tree is nested within a hierarchy including another said visual tree.

5. The method as described in claim 1, wherein the render tree defines rendering of the digital image outside of the zone and the visual tree defines rendering of the digital image inside of the zone.

6. The method as described in claim 1, wherein the visual ordering of the respective said objects within the zone differs from the visual ordering of the plurality of objects in the digital image outside of the zone as defined by the render tree.

7. The method as described in claim 1, wherein the scene graph structure includes metadata that contains a list identifying each said visual tree included in the digital image.

8. The method as described in claim 1, wherein the plurality of render nodes includes the plurality of objects and the plurality of visual nodes do not include copies of the plurality of objects.

9. The method as described in claim 1, wherein the plurality of objects are vector objects.

10. A method implemented by a processing device, the method comprising:
    receiving, by the processing device, a scene graph structure of a digital image, the scene graph structure including a render tree and a visual tree;
    rendering, by the processing device, the render tree having a plurality of render nodes that define a visual ordering of a plurality of objects in a digital image outside of a zone in the digital image;
    rendering, by the processing device, the visual tree for the zone within the digital image, the visual tree including a plurality of visual nodes that define a visual ordering of respective said objects within the zone and map to respective said render nodes of the render tree, in which, the visual ordering of the respective said objects within the zone differs from the visual ordering of the plurality of objects in the digital image outside of the zone as defined by the render tree; and
    displaying, by the processing device, the digital image based on the rendering of the render tree and the rendering of the visual tree.

11. The method as described in claim 10, wherein the plurality of visual nodes map to one or more of the plurality of objects in the render tree that at least partially overlap the zone.

12. The method as described in claim 10, wherein the visual tree defines a boundary of the zone within the digital image using a mask.

13. The method as described in claim 10, wherein the scene graph structure includes metadata that contains a list identifying each said visual tree included in the digital image.

14. The method as described in claim 10, wherein the plurality of render nodes includes the plurality of objects and the plurality of visual nodes do not include copies of the plurality of objects.

15. One or more computer-readable storage media storing instructions that, responsive to execution by a processing device, causes the processing device to perform operations including:
- generating a visual tree for a zone within a digital image, the visual tree including a plurality of visual nodes that define a visual ordering of respective objects within the zone and map to respective render nodes of a render tree corresponding to the respective objects;
- forming a scene graph structure that includes the render tree and the visual tree that defines rendering of the digital image; and
- storing the scene graph structure as part of the digital image.

16. The one or more computer-readable storage media as described in claim 15, wherein the plurality of visual nodes map to one or more of the plurality of objects in the render tree that at least partially overlap the zone.

17. The one or more computer-readable storage media as described in claim 15, wherein the visual tree defines a boundary of the zone within the digital image using a mask.

18. The one or more computer-readable storage media as described in claim 15, wherein the visual ordering of the respective objects within the zone differs from a visual ordering of the plurality of objects in the digital image outside of the zone as defined by the render tree.

19. The one or more computer-readable storage media as described in claim 15, wherein the scene graph structure includes metadata that contains a list identifying each said visual tree included in the digital image.

20. The one or more computer-readable storage media as described in claim 15, wherein the plurality of render nodes includes the respective objects and the plurality of visual nodes do not include copies of the respective objects.

* * * * *

UNITED STATES PATENT AND TRADEMARK OFFICE
CERTIFICATE OF CORRECTION

PATENT NO. : 12,271,976 B2
APPLICATION NO. : 18/160483
DATED : April 8, 2025
INVENTOR(S) : Harish Kumar, Praveen Kumar Dhanuka and Apurva Kumar It is certified that error appears in the above-identified patent and that said Letters Patent is hereby corrected as shown below:

On the Title Page

Item (57) Abstract, replace:
"Digital representation techniques of intertwined vector objects are described. These techniques support a non-destructive representation of intertwined digital objects. Additionally, these techniques support editing of overlaps to change a visual ordering in an intuitive and efficient manner. Optimization operations are also implemented that remove redundancy, combine overlaps into a single representation, address visual artifacts at borders between the intertwined objected, and so forth."

With:
--Scene graph structure generation and rendering techniques are described. The scene graph structure supports a compact representation of render trees for intertwined appearances. The scene graph structure also supports rendering of intertwined appearances with complex appearance attributes such as clips, transparency groups, blend modes and opacity masks. Further, these techniques support parallel execution in a graphics processing unit and as such improves performance and support real time feedback by applications to users on each of the operations involved in creating and editing a zone, performing partial rearrange operations, and performing transformations on intertwine groups.--

Signed and Sealed this
Twenty-fourth Day of June, 2025

Coke Morgan Stewart
*Acting Director of the United States Patent and Trademark Office*